US012341298B2

(12) United States Patent
Tamai et al.

(10) Patent No.: US 12,341,298 B2
(45) Date of Patent: Jun. 24, 2025

(54) ELECTRICAL CONNECTOR WITH STABLE STATE ELECTRICAL COMMUNICATION BETWEEN GROUND MEMBERS

(71) Applicant: Hirose Electric Co., Ltd., Kanagawa (JP)

(72) Inventors: Nobuhiro Tamai, Kanagawa (JP); Takafumi Sugawara, Kanagawa (JP); Shota Yamada, Kanagawa (JP); Xingyu Cheng, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 387 days.

(21) Appl. No.: 18/065,592

(22) Filed: Dec. 13, 2022

(65) Prior Publication Data

US 2023/0187879 A1 Jun. 15, 2023

(30) Foreign Application Priority Data

Dec. 14, 2021 (JP) ................................ 2021-202375

(51) Int. Cl.
*H01R 13/652* (2006.01)
*H01R 12/73* (2011.01)
(Continued)

(52) U.S. Cl.
CPC ......... *H01R 13/652* (2013.01); *H01R 12/732* (2013.01); *H01R 13/405* (2013.01);
(Continued)

(58) Field of Classification Search
CPC .. H01R 13/652; H01R 12/732; H01R 13/405; H01R 13/504; H01R 13/6471; H01R 43/24; H01R 12/716
See application file for complete search history.

(56) References Cited

U.S. PATENT DOCUMENTS

| | | | | |
|---|---|---|---|---|
| 11,646,533 | B2 * | 5/2023 | Wu | H01R 13/405 439/108 |
| 2019/0296469 | A1 * | 9/2019 | Stokoe | H01R 12/716 |
| 2025/0030198 | A1 * | 1/2025 | Huang | H01R 13/2407 |

FOREIGN PATENT DOCUMENTS

| | | | | |
|---|---|---|---|---|
| CN | 101273501 A | * | 9/2008 | H01R 12/727 |
| CN | 105703105 A | * | 6/2016 | H01R 12/716 |

(Continued)

*Primary Examiner* — Travis S Chambers
(74) *Attorney, Agent, or Firm* — Procopio, Cory, Hargreaves & Savitch LLP

(57) ABSTRACT

[Problem]
To provide an electrical connector capable of adequately ensuring a stable state of electrical communication between ground members.
[Means of Solution]
The retaining member, which retains rows of signal transmission paths consisting of multiple signal transmission paths arranged side by side in a direction along the major faces of the retaining member together with a first and a second ground member, has perforation portions extending in the through-thickness direction of the retaining member at locations between adjacent signal transmission paths; the electrical connector has provided therein a shorting member of electrically conductive plastics co-molded with the first ground member and second ground member; and the shorting member has first base portions that are located at the first ground member side and are in contact with the first ground member, second base portions that are located at the second ground member side and are in contact with the second ground member, and coupling portions that are located within the perforation portions and couple the first base portions and the second base portions.

3 Claims, 6 Drawing Sheets

(51) Int. Cl.

| | |
|---|---|
| ***H01R 13/405*** | (2006.01) |
| ***H01R 13/504*** | (2006.01) |
| ***H01R 13/6471*** | (2011.01) |
| ***H01R 43/24*** | (2006.01) |

(52) U.S. Cl.
CPC ....... *H01R 13/504* (2013.01); *H01R 13/6471* (2013.01); *H01R 43/24* (2013.01)

(56) References Cited

FOREIGN PATENT DOCUMENTS

| | | | | | |
|---|---|---|---|---|---|
| CN | 212162125 | U | * | 12/2020 | ........... H01R 12/724 |
| CN | 112260009 | A | * | 1/2021 | ............. H01R 13/02 |
| CN | 117832903 | A | * | 4/2024 | |
| JP | 2017-224389 | A | | 12/2017 | |
| TW | 202127745 | A | * | 7/2021 | ........... H01R 12/707 |

* cited by examiner (A)

(B)

ELECTRICAL CONNECTOR WITH STABLE STATE ELECTRICAL COMMUNICATION BETWEEN GROUND MEMBERS

CROSS-REFERENCE TO RELATED APPLICATIONS

This application claims priority to Japanese Patent Application No. 2021-202375, filed Dec. 14, 2021, the contents of which are incorporated herein by reference in its entirety for all purposes.

BACKGROUND

Technical Field

The present invention relates to an electrical connector.

Background Art

In electrical connectors with multiple signal terminals arranged side by side, it is known to dispose ground members along the signal terminals in order to prevent crosstalk (interference) between adjacent signal terminals. For example, as disclosed in Patent Document 1, an electrical connector having multiple blades with signal terminals and ground terminals arranged thereon side by side is provided with ground plates on the opposing faces of each blade. Specifically, in the terminal rows of each blade, a single ground terminal is disposed between pairs consisting of two adjacent signal terminals (signal terminal pairs), and the ground plates disposed on the opposing faces of the blade are bent in the through-thickness direction and placed in contact with the ground terminals at locations corresponding to the ground terminals. If such a configuration is used, each signal terminal pair becomes enclosed and shielded by the ground plates and the ground terminals when viewed in the longitudinal direction of the signal terminals (see FIG. 5 (A) in Patent Document 1), as a result of which crosstalk, etc., between the signal terminal pairs is prevented.

PATENT DOCUMENTS

[Patent Document 1]
Japanese Published Patent Application No. 2017-224389.

SUMMARY

Problems to be Solved

According to Patent Document 1, in order to reliably prevent crosstalk, etc., with the help of ground plates and ground terminals, it is desirable to establish stable electrical communication by placing the ground plates in gapless surface contact with the ground terminals, thereby adequately ensuring the balance of electrical coupling of the signal terminal pairs with the ground plates and the ground terminals. However, as described in Patent Document 1, configurations in which the major faces of the ground plates are placed in surface contact with the major faces of the ground terminals are readily affected by the shape of these major faces, and, for example, if gaps appear between these major faces as a result of certain distortion due to fabrication errors and the like, a stable state of electrical communication between the ground plates and ground terminals may prove difficult to ensure, and there is room for improvement in this respect.

In view of the aforesaid circumstances, it is an object of the present invention to provide an electrical connector capable of adequately ensuring a stable state of electrical communication between ground members.

Technical Solution

It is an object of the present disclosure to provide an electrical connector capable of adequately ensuring a stable state of electrical communication between ground members.

The inventive electrical connector has multiple metallic signal transmission paths, a plate-shaped retaining member of electrically insulating material retaining the multiple signal transmission paths, a first ground member of metal provided on one side of the retaining member in the through-thickness direction of the retaining member and a second ground member of metal provided on the other side, has multiple metallic signal transmission paths, a plate-shaped retaining member of electrically insulating material retaining the multiple signal transmission paths, and a first ground member of metal provided on one side of the retaining member in the through-thickness direction of the retaining member and a second ground member of metal provided on the other side.

In the present invention, such an electrical connector is characterized in that the retaining member, which retains rows of signal transmission paths consisting of the multiple signal transmission paths arranged side by side in a direction along the major faces of the retaining member together with the first ground member and the second ground member, has perforation portions extending in the through-thickness direction at locations between adjacent signal transmission paths; the electrical connector has provided therein a shorting member of electrically conductive plastics co-molded with the first ground member and the second ground member; and the shorting member has first base portions that are located at the first ground member side and are in contact with the first ground member, second base portions that are located at the second ground member side and are in contact with the second ground member, and coupling portions that are located within the perforation portions and couple the first base portions and the second base portions.

In the present invention, the first ground member and the second ground member are placed in electrical communication by shorting through the medium of the shorting member. The shorting member is formed by co-molding (insert molding) with the first ground member and the second ground member. Accordingly, during connector manufacture, a configuration in which the first base portions closely adhering to the first ground member and the second base portions closely adhering to the second ground member form a single part through the medium of the coupling portions is readily obtained simply by injecting molten electrically conductive plastic material into a mold used for co-molding and allowing it to solidify. In the shorting member molded as a single part in this manner, the first base portions, second base portions, and coupling portions form a single piece in a continuous manner. Consequently, it is possible to ensure a stable state of electrical communication between the first ground member and the second ground member shorted by the shorting member.

In the present invention, in addition to having the first base portions, second base portions, and the coupling portions at multiple locations in the array direction of the signal transmission paths, the shorting member may have linking portions that extend in the array direction along the first ground member and the second ground member and link the first base portions together and the second base portions together at the multiple locations.

Due to the fact that the multiple first base portions and second base portions are respectively coupled by the linking portions in this manner on both sides of the retaining member, these first base portions and second base portions form a single piece through the medium of the linking portions, as a result of which the state of electrical communication between the first ground member and the second ground member through the medium of the shorting member is made more stable.

In the present invention, the linking portions may be in surface contact with each of the first ground member and the second ground member. Placing the linking portions in surface contact with the respective major faces of the first ground member and the second ground member in this manner increases the area of contact of the linking portions with the first ground member and the second ground member, as a result of which the state of electrical communication between the first ground member and the second ground member through the medium of the shorting member is made more stable.

Effects of the Invention

In the present invention, a configuration in which the first base portions closely adhering to the first ground member and the second base portions closely adhering to the second ground member form a single part through the medium of the coupling portions is readily obtained due to the fact that the shorting member of electrically conductive plastics is formed by co-molding with the first ground member and the second ground member. As a result, it is possible to ensure a stable state of electrical communication between the first ground member and the second ground member shorted by the shorting member.

DETAILED DESCRIPTION

An embodiment of the present invention will be described hereinbelow with reference to the accompanying drawings.

Figure 1:
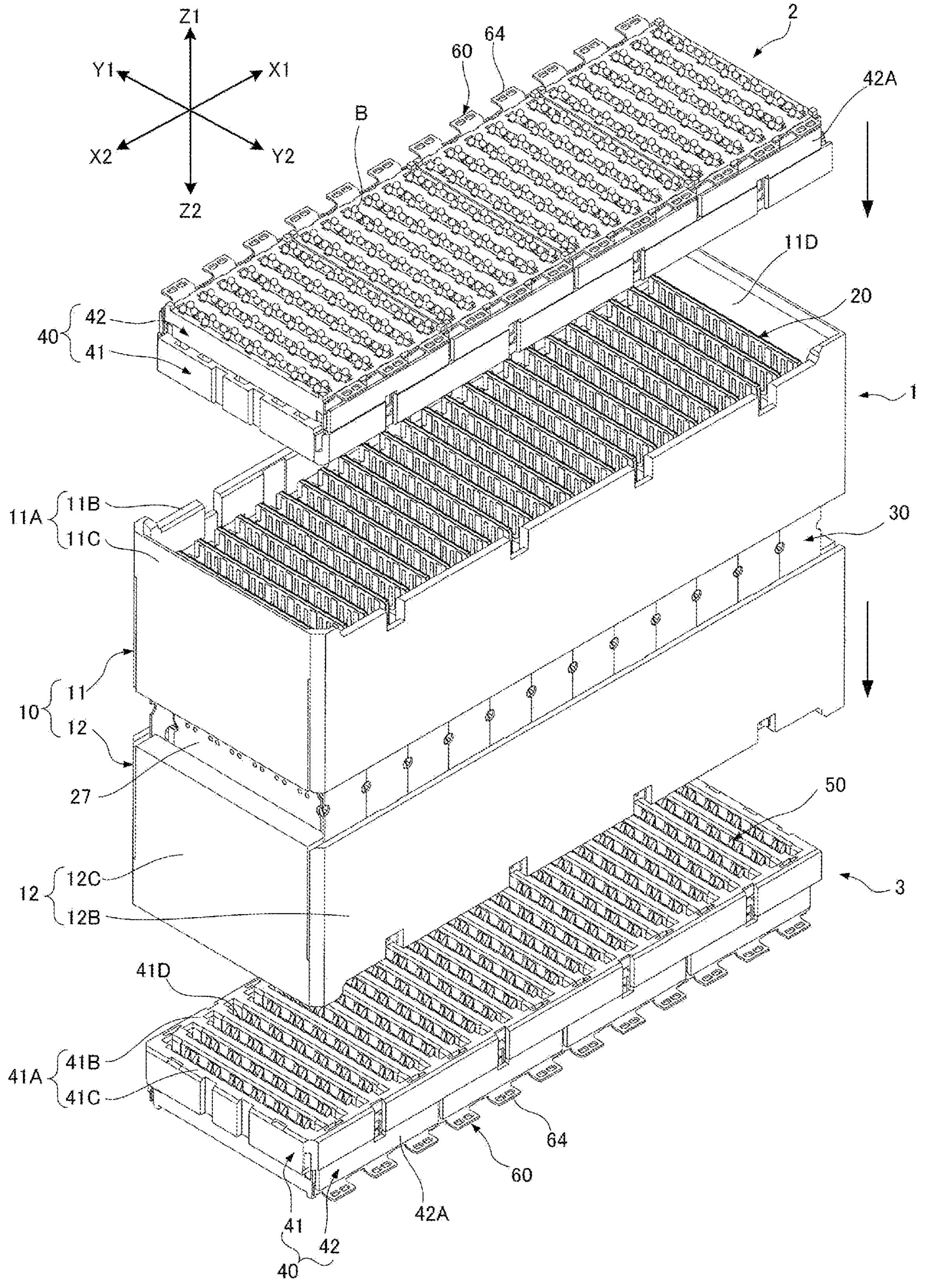
FIG. 1 is a perspective view illustrating electrical connectors for circuit boards according to an embodiment of the present invention together with an intermediate electrical connector, shown prior to mating.

FIG. 1 is a perspective view illustrating connectors for circuit boards 2, 3 (respectively referred to as "board connector 2" and "board connector 3" hereinbelow) according to an embodiment of the present invention together with an intermediate electrical connector 1 (referred to as "intermediate connector 1" hereinbelow), shown prior to mating. In the present embodiment, the intermediate connector 1 and the board connectors 2, 3 form an electrical connector assembly transmitting high-speed differential signals. The board connectors 2, 3, which are electrical connectors for circuit boards disposed on respective different circuit boards (see FIG. 3 (A)), are mated with the intermediate connector 1 in an orientation in which the surface of each circuit board is normal to the up-down direction, i.e., the connector height direction (Z-axis direction). Specifically, board connector 2 is mated with the intermediate connector 1 from above (side Z1) and board connector 3 is matingly connected thereto from below (side Z2), thereby electrically connecting the board connectors 2, 3 through the medium of the intermediate connector 1. In the present embodiment, the board connectors 2, 3 are formed as electrical connectors of exactly the same shape.

As can be seen in FIG. 1, the intermediate connector 1 has multiple intermediate circuit boards 20 (see also FIG. 2 (A)), a housing 10 made of resin or another electrically insulating material that supports the multiple intermediate circuit boards 20 arranged side by side at predetermined intervals in the through-thickness direction (X-axis direction) thereof, and two hereinafter-described coupling members 30 made of sheet metal.

The housing 10 has a substantially rectangular parallelepiped-like exterior configuration, whose longitudinal direction (referred to as the "connector length direction" hereinbelow) is the array direction (X-axis direction) of the intermediate circuit boards 20. The housing 10 has an upper housing 11 supporting the top sections of the intermediate circuit boards 20 and a lower housing 12 supporting the bottom sections of the intermediate circuit boards 20. The upper housing 11 and the lower housing 12 are coupled through the medium of the coupling members 30.

The upper housing 11 has a perimeter wall 11A having a square frame configuration when viewed from above and surrounding the multiple intermediate circuit boards 20, and multiple intermediate walls (not shown) used to position the multiple intermediate circuit boards 20 at predetermined intervals in the connector length direction (X-axis direction). The perimeter wall 11A includes two lateral walls 11B extending in the connector length direction (X-axis direction) and two end walls 11C extending in the connector width direction (Y-axis direction) perpendicular to the connector length direction and coupling the end portions of the two lateral walls 11B. Within the space enclosed by the perimeter wall 11A, the intermediate walls, which have a plate-like configuration with major faces perpendicular to the connector length direction and couple the interior wall surfaces of the two lateral walls 11B, are formed in a side-by-side arrangement at predetermined intervals in the connector length direction.

Slit-shaped spaces formed extending in the up-down direction between adjacent intermediate walls or between the intermediate walls and the end walls 11C constitute board accommodating spaces (not shown) used to accommodate the top sections of the intermediate circuit boards 20. In addition, multiple upper locking stepped portions (not shown), i.e., stepped portions capable engaging and locking with the hereinafter-described upper locking pieces (not shown) of the coupling members 30, are formed on the interior side faces of the lateral walls 11B at predetermined intervals in the connector length direction (X-axis direction).

The perimeter wall 11A extends upwardly of the top ends of the intermediate walls. The space enclosed by this upwardly extending section, i.e., the space that is upwardly open and placed in communication with the board accommodating spaces, is formed as an upper receiving portion 11D intended for receiving board connector 2 from above. As can be seen in FIG. 1, when the intermediate circuit boards 20 are accommodated within the board accommodating spaces, the upper end sections of the intermediate circuit boards 20 protrude from the top end openings of the board accommodating spaces and are located within the upper receiving portion 11D.

The lower housing 12, which is identical in shape to the previously discussed upper housing 11, is provided in an orientation that is vertically symmetrical with respect to the upper housing 11 and accommodates the bottom sections of the intermediate circuit boards 20 within slit-shaped board accommodating spaces (not shown). In the lower housing 12, reference numerals obtained by adding "1" to the reference numerals used in the upper housing 11 are assigned to the sections corresponding to the respective components of the upper housing 11, and, in addition, the names of the respective components of the lower housing 12 are obtained by substituting "lower" for "upper" in the names of the respective components of the upper housing 11, and further description of the lower housing 12 is omitted herein.

The coupling members 30 are made by stamping and partially bending sheet metal members. The coupling members 30 extend over the array range of the intermediate circuit boards 20 such that the longitudinal direction is the connector length direction (X-axis direction) in an orientation wherein the through-thickness direction thereof coincides with the connector width direction (Y-axis direction), with one member provided on each side of the intermediate circuit boards 20 in the connector width direction. Upper locking pieces (not shown), which engage and lock with the upper locking stepped portions in the up-down direction (Z-axis direction), are formed by cutting out and lifting a portion of the coupling members 30 at the top ends of the coupling members 30 at locations corresponding to the upper locking stepped portions (not shown) of the upper housing 11 in the connector length direction. In the same manner as the upper locking pieces (not shown), lower locking pieces (not shown), which engage and lock with the lower locking stepped portions (not shown) of the lower housing 12 in the up-down direction (Z-axis direction), are provided at the bottom ends of the coupling members 30.

Figure 2B:
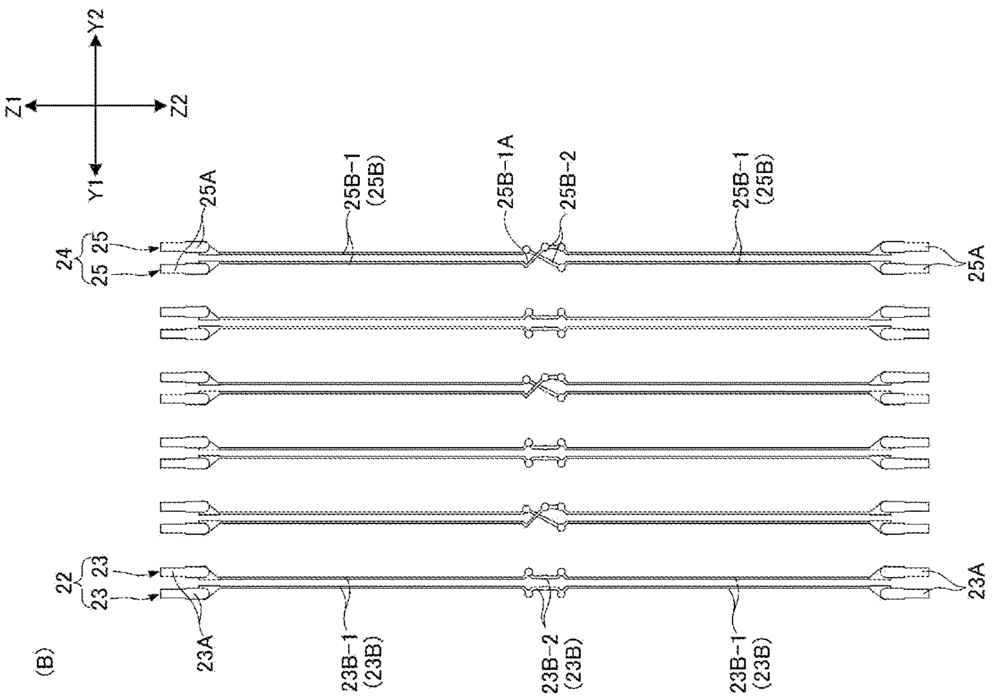
FIG. 2 (A) is a perspective view illustrating an intermediate circuit board of the intermediate electrical connector of FIG. 1 in isolation, and FIG. 2 (B) is a front view illustrating only the electrically conductive pattern pairs of the intermediate circuit board of FIG. 2 (A).
Figure 2A:
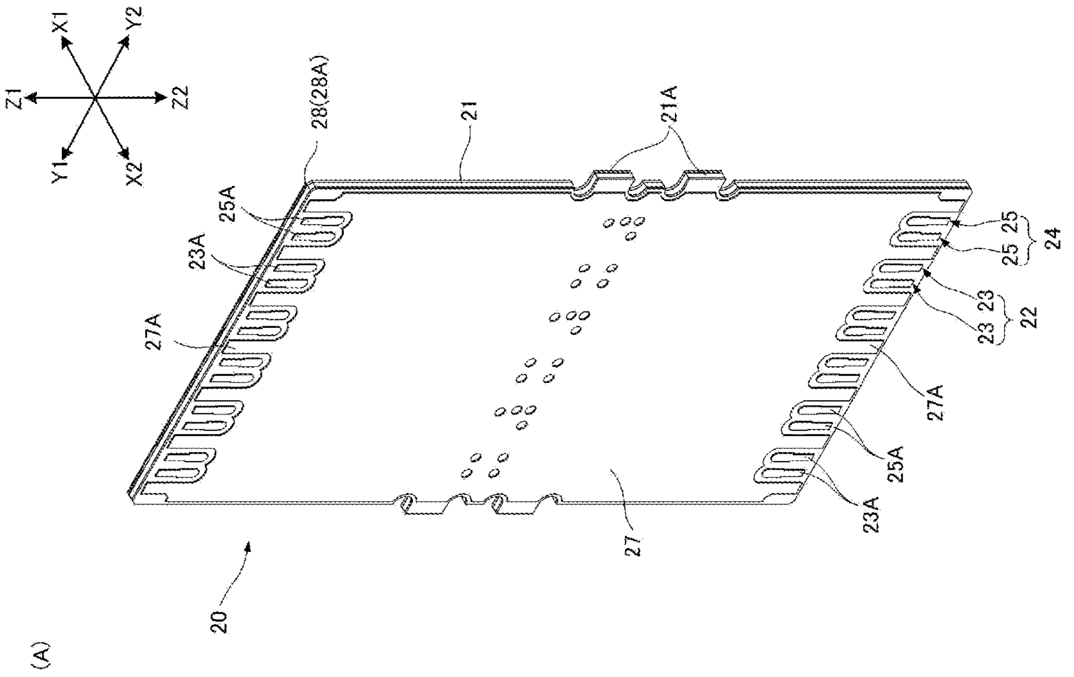

FIG. 2 (A) is a perspective view illustrating an intermediate circuit board 20 in isolation, and FIG. 2 (B) is a front view illustrating only the electrically conductive pattern pairs of the intermediate circuit board of FIG. 2 (A). As shown in FIG. 2 (A), the intermediate circuit board 20 has a base 21 made of resin or another electrically insulating material, electrically conductive patterns (electrically conductive pattern pairs 22, 24, to be described hereinbelow) constituting transmission path pairs serving as signal transmission paths formed on the base 21, multiple ground vias (not shown) located between the electrically conductive pattern pairs 22, 24, and ground layers 27, 28 (the first ground layer 27 and the second ground layer 28, to be described hereinbelow) formed covering both major faces of the base 21 (faces perpendicular to the through-thickness direction (X-axis direction)).

As can be seen in FIG. 2 (A), two supported protrusions 21A are formed as projections on the base 21 at locations proximate the middle of the each side edge extending in the up-down direction, and the base 21 is supported by the housing with the help of the supported protrusions 21A. In addition, multiple electrically conductive patterns, which are strip-like in shape and extend in the up-down direction, are formed on the base 21 in a side-by-side arrangement in the connector width direction (Y-axis direction) (see FIG. 2 (B)). The multiple electrically conductive patterns include electrically conductive pattern pairs 22, 24 serving as transmission path pairs. The electrically conductive pattern pairs 22, 24 include two types of pairs, i.e., straight pairs 22 and cross pairs 24. In the present embodiment, as can be seen in FIG. 2 (B), the straight pairs 22 and cross pairs 24 are disposed in an alternating manner in the connector width direction (Y-axis direction).

The straight pairs 22 have a pair of straight patterns 23 extending at a spaced interval from each other all the way from one end to the other in the up-down direction. When viewed in the through-thickness direction of the base 21 (in the X-axis direction perpendicular to the plane of the drawing in FIG. 2 (B)), the pair of straight patterns 23 are laterally and vertically symmetrical in shape to each other. The straight patterns 23 have signal connection portions 23A used for connecting to the board connectors 2, 3, multiple thin strip portions 23B extending separately in the up-down direction, and multiple signaling vias (not shown) extending in the through-thickness direction (X-axis direction) through the thickness of the base 21.

As can be seen in FIG. 2 (B), the signal connection portions 23A are located at the opposite ends of the straight patterns 23 in the up-down direction and, as can be seen in FIG. 2 (A), are exposed from the major face of the base 21 on side X2. In the present embodiment, the thin strip portions 23B are formed in two layers within the thickness of the base 21. Specifically, as can be seen in FIG. 2 (B), the thin strip portions 23B, which are divided into three sections split in the up-down direction, have long thin strip portions 23B-1 located respectively in the upper and lower areas, and a short thin strip portion 23B-2 located in the intermediate area.

In the present embodiment, the two long thin strip portions 23B-1 are formed in the layer located on side X2 (in front of the plane of the drawing in FIG. 2 (B)) in the through-thickness direction of the base 21 (X-axis direction perpendicular to the plane of the drawing in FIG. 2 (B)), and the short thin strip portion 23B-2 is formed in the layer located on side X1 (behind the plane of the drawing in FIG. 2 (B)).

The signaling vias (not shown) are cylindrical in shape and extend in the through-thickness direction of the base 21 (X-axis direction) at the locations of the opposite ends in the up-down direction in each of the above-described three sections of the thin strip portions 23B. The signaling vias couple and electrically interconnect the above-mentioned three sections of the thin strip portions 23B and, in addition, the signal connection portions 23A and the upper and bottom ends of the thin strip portions 23B. As a result, a single straight pattern 23 is formed by the signal connection portions 23A, thin strip portions 23B, and signaling vias.

In the present embodiment, as described above, signaling vias extending though the two layers are included into the straight patterns 23, as a result of which the length of the signal transmission paths in the straight patterns 23 is adjusted to a length substantially the same as the length of the signal transmission paths in the hereinafter-described cross patterns 25 of the cross pairs 24.

The cross pairs 24 have a pair of cross patterns 25. As can be seen in FIG. 2 (B), when viewed in through-thickness direction of the base 21 (X-axis direction), the pair of cross patterns 25 intersect without making contact with each other at an intermediate location in the up-down direction. When viewed in the through-thickness direction of the base 21 (in the X-axis direction perpendicular to the plane of the drawing in FIG. 2 (B)), the pair of cross patterns 25 are laterally and vertically asymmetrical in shape to each other. In the same manner as the straight patterns 23, the cross patterns 25 also have signal connection portions 25A used for connecting to the board connectors 2, 3, multiple thin strip portions 25B extending separately in the up-down direction, and multiple signaling vias (not shown) extending in the through-thickness direction (X-axis direction) through the thickness of the base 21.

Since the configuration of the cross patterns 25 is similar to the previously discussed straight patterns 23 with the exception of the thin strip portions 25B, the common sections are assigned reference numerals obtained by adding "2" to the reference numerals of the corresponding sections in the straight patterns 23, and further description is omitted herein. The thin strip portions 25B of the cross patterns 25 have one short thin strip portion 25B-2 and two long thin strip portions 25B-1 coupled by signaling vias.

As can be seen in FIG. 2 (B), among the long thin strip portions 25B-1 in the pairs of cross patterns 25 constituting the cross pairs 24, i.e., among the four total long thin strip portions 25B-1, only one long thin strip portion 25B-1 located on the Y1 and upper (Z1) side is formed slightly longer than the other three long thin strip portions 25B-1. Specifically, the above-mentioned long thin strip portion 25B-1 has formed therein a slanted portion 25B-1A whose bottom end portion extends at a slant toward side Y2, and is thus made longer than other long thin strip portion 25B-1 in exact proportion to this slanted portion 25B-1A.

All the long thin strip portions 25B-1 of the pair of cross patterns 25 are formed in the layer located on side X2 (in front of the plane of the drawing in FIG. 2 (B)) in the through-thickness direction of the base 21 (X-axis direction perpendicular to the plane of the drawing in FIG. 2 (B)). On the other hand, the short thin strip portion 25B-2 is formed in the layer located on side X1 (behind the plane of the drawing in FIG. 2 (B)).

In the present embodiment, as can be seen in FIG. 2 (B), one short thin strip portion 25B-2 coupled to the previously discussed slanted portion 25B-1A extends without sloping in the up-down direction and is made shorter than the hereinafter-described other short thin strip portion 25B-2. On the other hand, when viewed in the through-thickness direction of the base 21 (X-axis direction), the other short thin strip portion 25B-2 extends at a slant on side Y1 as one moves downwardly, and intersects with the slanted portion 25B-1A. The above-mentioned other short thin strip portion 25B-2 is formed slightly longer than the slanted portion 25B-1A.

In the pair of cross patterns 25, due to this intersection, the slanted portion 25B-1A of the long thin strip portion 25B-1 and the other short thin strip portion 25B-2 avoid making contact with each other. In addition, the number of signaling vias is increased by forming the above-mentioned one short thin strip portion 25B-2 in the layer located on side X1 (behind the plane of the drawing in FIG. 2 (B)), as a result of which the lengths of the signal transmission paths of the two cross patterns 25 constituting the cross pair 24 are made substantially the same.

Multiple grounding vias (not shown) are formed in a side-by-side arrangement in the up-down direction between the straight pairs 22 and cross pairs 24 in the connector width direction (Y-axis direction). The grounding vias, which have a cylindrical shape extending in the through-thickness direction (X-axis direction) through the thickness of the base 21, couple the hereinafter-described first ground layer 27 and second ground layer 28.

The ground layers 27, 28, which are provided in the form of metal layers, are formed such that the first ground layer 27 covers the major face of the base 21 on side X2 and, in addition, the second ground layer 28 covers the major face of the base 21 on side X1. Although the ground layers 27, 28 are formed in a range that extends from the top end to the bottom end of the base 21, as can be seen in FIG. 2 (A), in the first ground layer 27, the sections corresponding to the signal connection portions 23A, 25A of the electrically conductive pattern pairs 22, 24 in the connector width direction have been cut away at the top and bottom ends, as a result of which the signal connection portions 23A, 25A have been exposed. The sections that have not been cut away at the top and bottom ends of the first ground layer 27 constitute first ground layer connection portions 27A used for connecting to the hereinafter-described first ground members 54 of the board connectors 2, 3. On the other hand, the top and bottom ends of the second ground layer 28, where no sections have been cut away, constitute second ground layer connection portions 28A used for connecting to the hereinafter-described second ground members 55 of the board connectors 2, 3.

The configuration of the board connectors 2, 3 will be described next. Since the board connectors 2, 3 have exactly the same configuration, as can be seen in FIG. 1, the description below will focus on the configuration of the board connector 3, and description of the board connector 2, except for assigning the same reference numerals as in the board connector 3, will be omitted. As can be seen in FIG. 1, the board connector 3 has a housing 40, which is formed with a rectangular parallelepiped-like external configuration adapted for the lower receiving portion (not shown) of the lower housing 12 of the intermediate connector 1, multiple terminal retainers 50 arranged side by side and retained in the housing 40, and two hereinafter-described anchoring members 60 made of sheet metal.

As shown in FIG. 1, the housing 40, which is made of resin or another electrically insulating material, has a substantially rectangular parallelepiped-like exterior configuration whose longitudinal direction (connector length direction) is the array direction (X-axis direction) of the terminal retainers 50. The housing 40 has an upper housing 41 and a lower housing 42 formed by splitting in the up-down direction. The upper housing 41 and the lower housing 42 are coupled through the medium of the anchoring members 60. The housing 40 accommodates and holds multiple terminal retainers 50 arranged side by side in the connector length direction.

The upper housing 41 has a peripheral wall 41A that is of a square frame configuration when viewed in the up-down direction, and multiple intermediate walls 41D that extend in the connector width direction (Y-axis direction) within the space enclosed by the peripheral wall 41A. The peripheral wall 41A has two lateral walls 41B that extend along the connector length (X-axis direction), and two end walls 41C that extend in the connector width direction, i.e., in a transverse direction perpendicular to the connector length direction, and couple the end portions of the two lateral walls 41B. The multiple intermediate walls 41D extend in the connector width direction and couple the interior wall faces of the two lateral walls 41B. Groove-shaped upper coupling groove portions (not shown) extending in the up-down direction are formed in the lateral walls 41B at multiple locations spaced at predetermined intervals in the connector length direction.

The lower housing 42 retains in place the multiple terminal retainers 50 arranged side by side at equal intervals in the connector length direction (X-axis direction). Groove-shaped lower coupling groove portions (not shown) that extend in the up-down direction in communication with the upper coupling groove portions are formed in the two lateral walls 42A of the lower housing 42 at the same locations in the connector length direction as the upper coupling groove portions of the upper housing 41.

Figure 3A:
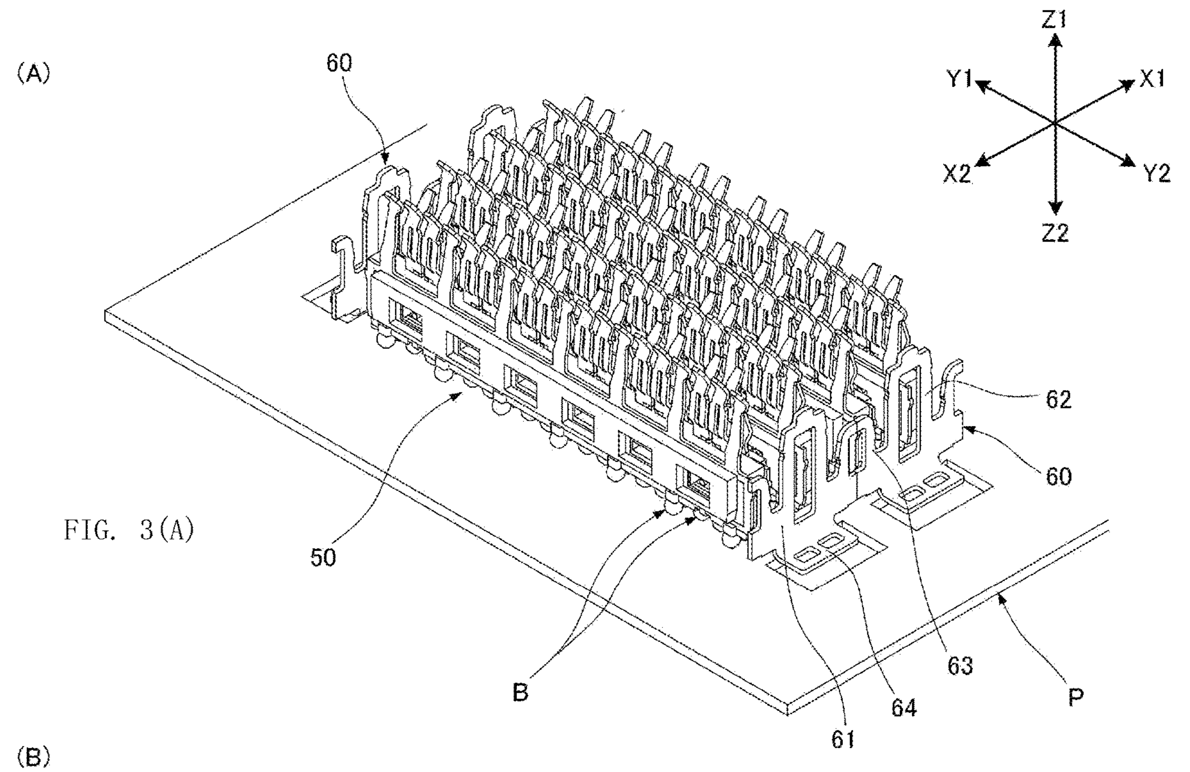
FIG. 3 (A) is a perspective view illustrating some of the terminal retainers in the electrical connector for circuit boards of FIG. 1 together with anchoring members, and FIG. 3 (B) is a perspective view illustrating a terminal retainer of FIG. 3 (A) in isolation.
Figure 3B:
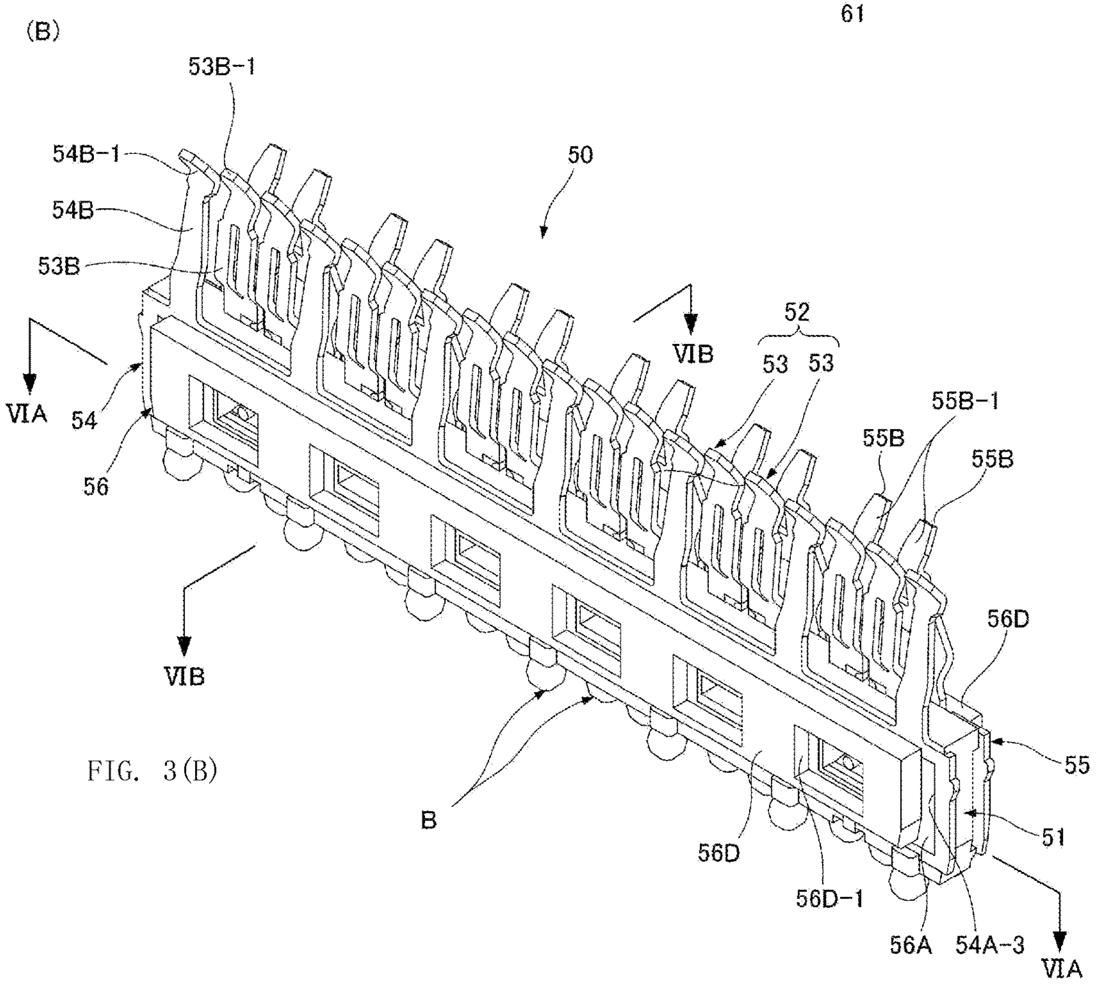

FIG. 3 (A) is a perspective view illustrating some of the terminal retainers 50 in the board connector 3 of FIG. 1 together with the anchoring members 60, in which they are shown disposed on circuit board P. FIG. 3 (B) is a perspective view illustrating a terminal retainer 50 of FIG. 3 (A) in isolation. As shown in FIG. 3 (A), the anchoring members 60 are made by stamping and bending, in the through-thickness direction, sheet metal members extending in the connector length direction (X-axis direction). The anchoring members 60 extend in the connector length direction over the entire span of the array range of the terminal retainers 50 and are disposed at the locations of the opposite ends of the board connector 3 in the connector width direction (Y-axis direction).

The anchoring members 60 have lateral plate portions 61 that have major faces perpendicular to the connector width direction, long press-fit portions 62 and short press-fit portions 63 that extend upwardly from the top edges of the lateral plate portions 61 at multiple locations in the connector length direction, and anchor portions 64 that are bent in the through-thickness direction at the bottom edges of the lateral plate portions 61 at multiple locations in the connector length direction and extend outwardly in the connector width direction.

The long press-fit portions 62 are provided at the corresponding locations between the terminal retainers 50 in the connector length direction, and the short press-fit portions 63 are provided at locations corresponding to the terminal retainers 50 in the connector length direction. In other words, the long press-fit portions 62 and the short press-fit portions 63 are provided in an alternating manner in the connector length direction. The short press-fit portions 63, which are made shorter than the long press-fit portions 62 in the up-down direction, have their top ends located downwardly of the top ends of the long press-fit portions 62. The anchoring members 60 are retained in the housing 40 due to the fact that the long press-fit portions 62 and the short press-fit portions 63 are press-fitted from below into both the upper coupling groove portions and the lower coupling groove portions of the housing 40. In addition, the anchoring members 60 are secured to circuit board P due to the fact that the anchor portions 64 are solder-connected to the corresponding portions of the mounting face of circuit board P.

As can be seen in FIG. 3 (B), the terminal retainer 50 has a retaining member 51 made of resin or another electrically insulating material, multiple signal terminal pairs 52 of sheet metal constituting transmission path pairs serving as signal transmission paths arranged side by side in the connector width direction (Y-axis direction) and retained by the retaining member 51, as well as a first ground member 54 and a second ground member 55 of sheet metal attached to the major faces of the retaining member 51 (faces extending in the YZ direction) (referred to collectively as "ground members 54, 55" hereinbelow if there is no need to distinguish between the two), and a shorting member 56 of electrically conductive plastics integrally attached to the ground members 54, 55.

Figure 4A:
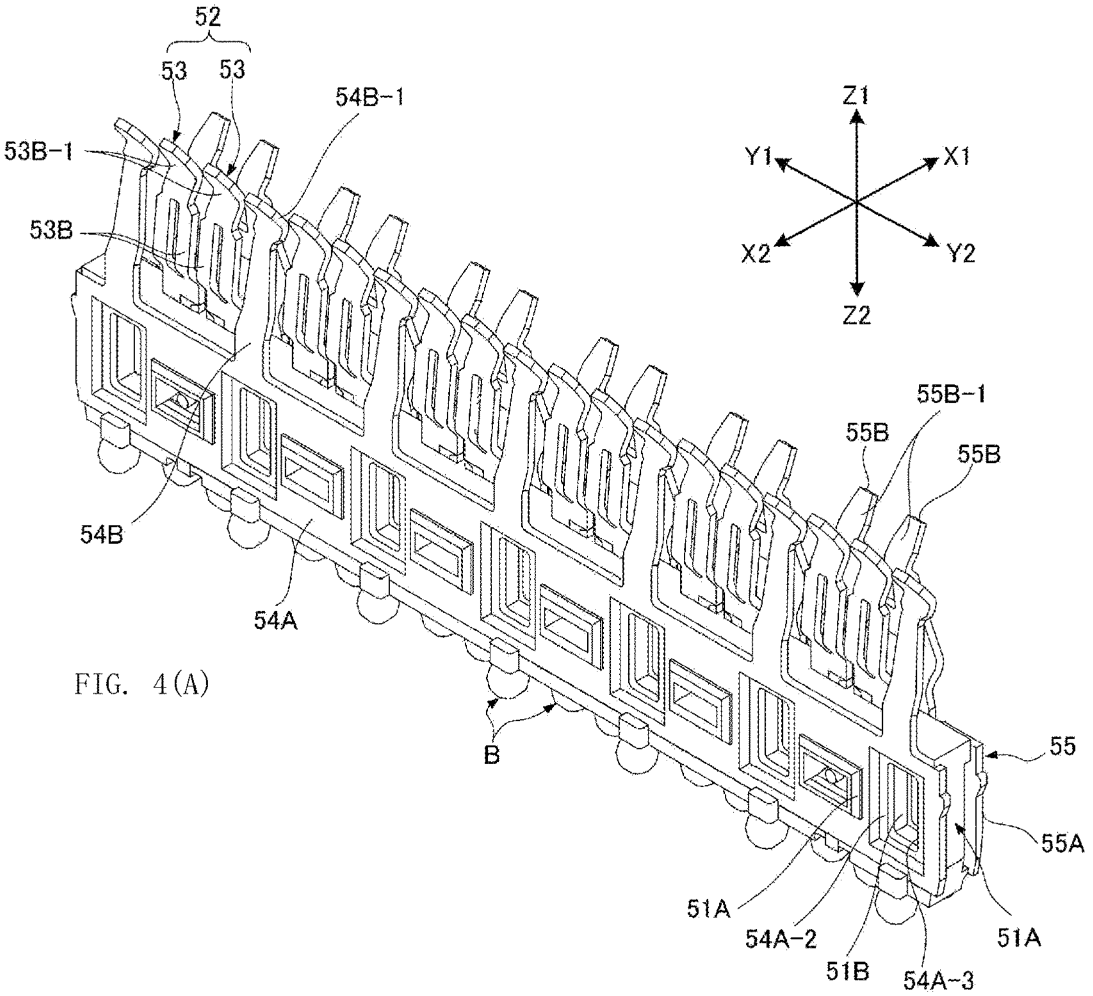
FIG. 4 (A) is a perspective view of the terminal retainer, shown with the shorting member of FIG. 3 (B) omitted, and FIG. 4 (B) is a perspective view illustrating only the shorting member of the terminal retainer of FIG. 3 (B).
Figure 4B:
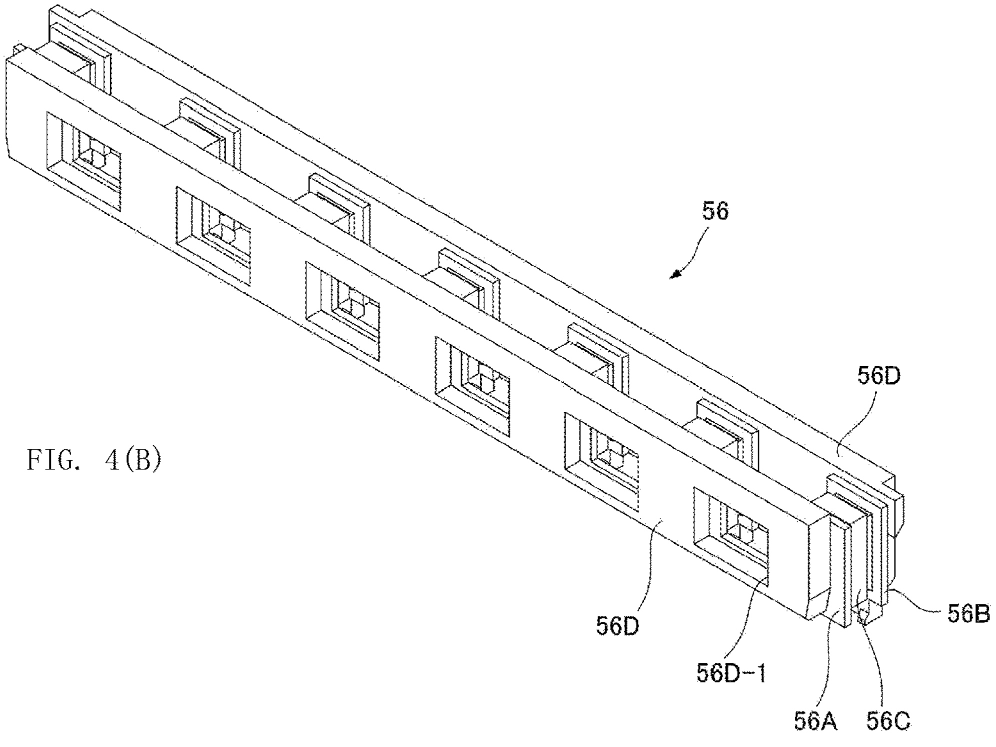
Figure 5:
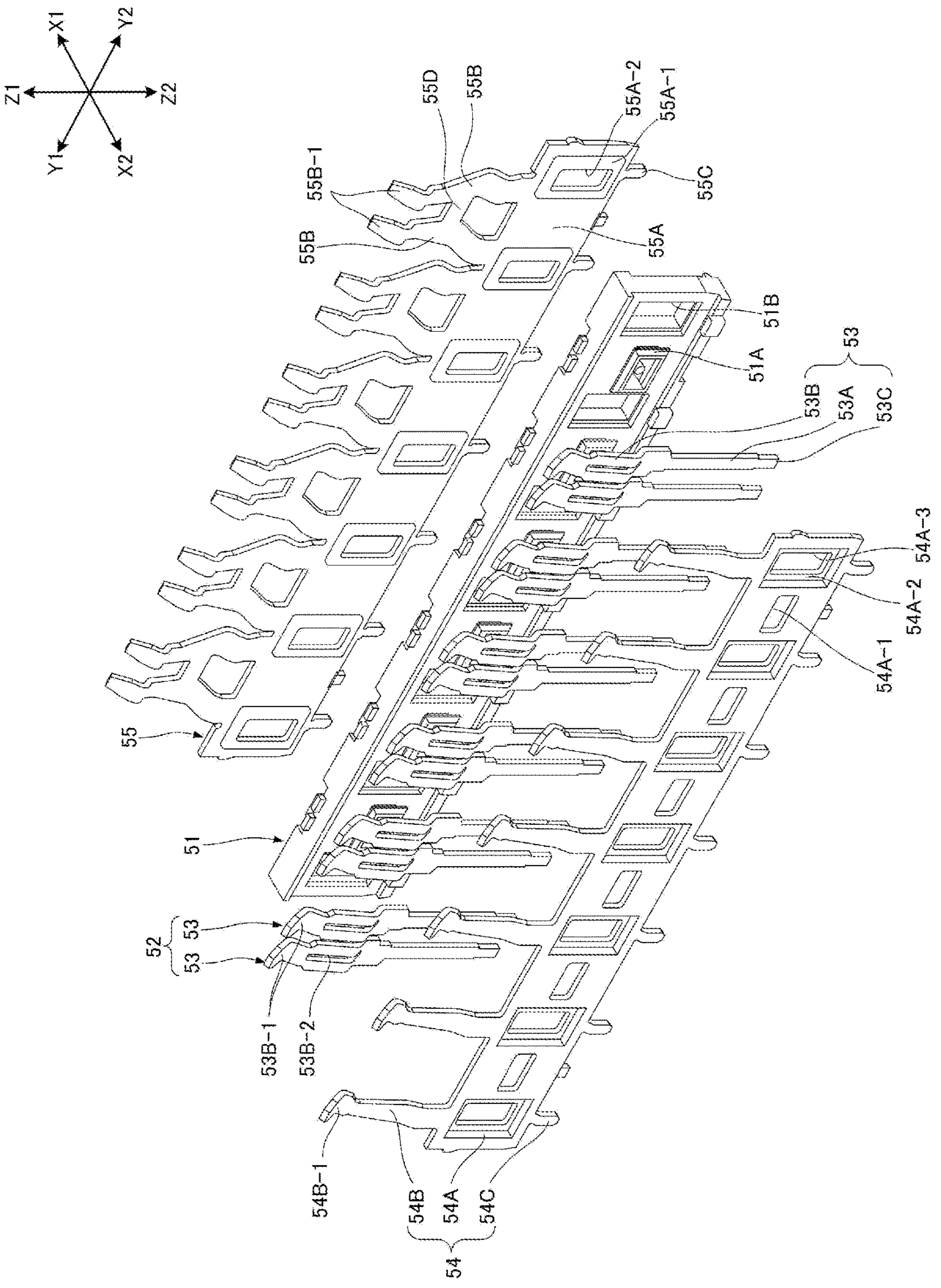
FIG. 5 is a perspective view illustrating the components of the terminal retainer of FIG. 4 (A) in isolation.

FIG. 4 (A) is a perspective view of a terminal retainer 50, shown with the shorting member 56 of FIG. 3 (B) omitted, and FIG. 4 (B) is a perspective view illustrating only the shorting member 56 of the terminal retainer 50 of FIG. 3 (B). FIG. 5 is a perspective view illustrating the components of the terminal retainer 50 of FIG. 4 (A) in isolation. In addition, FIG. 6 (A) is a cross-sectional view illustrating a portion (section on side Y1 in the connector width direction (Y-axis direction)) of a VIA-VIA cross-section of the terminal retainer 50 illustrated in FIG. 3 (B) on an enlarged scale, and FIG. 6 (B) is a VIB-VIB cross-sectional view of the terminal retainer 50 illustrated in FIG. 3 (B).

As shown in FIG. 4 (A), the retaining member 51, which has a plate-like configuration extending across the terminal array range in the connector width direction (Y-axis direction) as shown in FIG. 5, retains in place rows consisting of multiple signal terminal pairs 52 arranged side by side in the connector width direction (Y-axis direction) along the major faces of the retaining member 51 (rows of signal transmission paths) together with the ground members 54, 55. As shown in FIG. 5, retaining aperture portions 51B, which are perforation portions, and retaining protrusions 51A, which are used to retain the ground members 54, 55, are formed in the retaining member 51.

The retaining protrusions 51A, which are formed protruding from the major face of the retaining member 51 on side X2 at the same locations in the connector width direction as the hereinafter-described retained aperture portions 54A-1 of the first ground member 54, are adapted to retain the first ground member 54. As shown in FIG. 5, the retaining protrusions 51A, which are formed with a generally rectangular prismatic shape, are of a quadrangular shape whose longitudinal direction is the connector width direction (Y-axis direction) when viewed in the through-thickness direction of the retaining member 51 (X-axis direction).

The retaining aperture portions 51B are formed extending in the through-thickness direction (X-axis direction) through the retaining member 51 in the through-thickness direction (X-axis direction) at locations different from the signal terminal pairs 52 in the connector width direction, i.e., at locations between adjacent signal terminal pairs 52 as well as locations outward of the signal terminal pairs 52 located at the opposite ends in the connector width direction. The retaining aperture portions 51B are of a quadrangular shape whose longitudinal direction is the up-down direction (Z-axis direction) when viewed in the through-thickness direction of the retaining member 51 (X-axis direction). It should be noted that the perforation portions need not be aperture portions and, for example, may be formed as notched portions which extend through the retaining member 51 in the through-thickness direction and have a portion of their perimeter edge open.

The multiple signal terminal pairs 52, which correspond to the electrically conductive pattern pairs 22, 24 provided on the intermediate circuit boards 20 of the intermediate connector 1, are arranged side by side at predetermined intervals such that the array direction is the connector width direction (Y-axis direction). As can be seen in FIG. 5, each signal terminal pair 52 has a pair of straight terminals 53 that extend at a spaced interval from one another all the way from one end to the other in the up-down direction and constitute a straight pair. The straight terminals 53 have rectilinear retained portions 53A retained by the retaining member 51 by co-molding (insert molding), resilient signal arm portions 53B extending upwardly from the retained portions 53A, and signal connection portions 53C extending downwardly from the retained portions 53A.

As can be seen in FIG. 5, the resilient signal arm portions 53B, which are formed to have wider terminal width dimensions (width dimensions in the Y-axis direction) than the retained portions 53A, are adapted for resilient displacement in the through-thickness direction (X-axis direction) thereof. In the present embodiment, the resilient signal arm portions 53B have a slit 53B-2 extending in the up-down direction formed at an intermediate location in the terminal width direction thereof, and have two narrow arm portions located on the opposite sides of this slit 53B-2, thereby facilitating resilient displacement. Signal contact portions 53B-1 used for contacting the signal connection portions 23A of the electrically conductive pattern pairs 22, 24 provided in the intermediate connector 1 are formed protruding curvingly toward side X1 in the top end portions of the resilient signal arm portions 53B. As can be seen in FIG. 5, the signal connection portions 53C are formed in a rectilinear manner with terminal width dimensions that are somewhat smaller than those of the retained portions 53A. Solder balls B are attached to the signal connection portions 53C (see FIG. 3 (A, B) and FIG. 4 (A)). The signal connection portions 53C are solder-connected to signal circuits (not shown) of circuit board P (see FIG. 3 (A)) by the solder balls B.

The first ground member 54, which is attached to the major face of the retaining member 51 on side X2, has a first ground plate portion 54A extending along said major face, first grounding resilient arm portions 54B extending upwardly from the first ground plate portion 54A at multiple locations in the connector width direction (Y-axis direction), and first ground connection portions 54C extending downwardly from the first ground plate portion 54A at multiple locations in the connector width direction.

As can be seen in FIG. 5, retained aperture portions 54A-1 and retained protrusions 54A-2 are formed in the first ground plate portion 54A in an alternating manner at predetermined intervals in the connector width direction. The retained aperture portions 54A-1, which are aperture portions extending through the first ground plate portion 54A in a substantially quadrangular shape whose longitudinal direction is the connector width direction, are formed at corresponding locations between the first grounding resilient arm portions 54B adjacent in the connector width direction.

The retained protrusions 54A-2 protrude toward side X1 on both sides of the retained aperture portions 54A-1 at locations corresponding to the first grounding resilient arm portions 54B in the connector width direction, in other words, at locations different from the signal terminal pairs 52. Namely, as shown in FIG. 5, the retained protrusions 54A-2 are positioned in alignment with the retaining aperture portions 51B of the retaining member 51. When viewed in the through-thickness direction of the retaining member 51 (X-axis direction), the retained protrusions 54A-2 have a shape adapted to the retaining aperture portions 51B, i.e., a quadrangular shape whose longitudinal direction is the up-down direction. The retained aperture portions 54A-1 and retained protrusions 54A-2 are retained by co-molding (insert molding) while being engaged with, respectively, the retaining protrusions 51A and retaining aperture portions 51B of the retaining member 51.

In addition, as can be seen in FIG. 5, the first ground plate portion 54A has first ground through-hole portions 54A-3 extending through the first ground plate portion 54A in the through-thickness direction (X-axis direction) at locations corresponding to the retained protrusions 54A-2. The first ground through-hole portions 54A-3 are aperture portions of a quadrangular shape whose longitudinal direction is the up-down direction when viewed in the through-thickness direction of the first ground plate portion 54A. As can be seen in FIG. 5, the first ground through-hole portions 54A-3 are aperture portions, in which the section extending through the retained protrusions 54A-2 (section on side X1) is just a bit smaller than the other part (section on side X2).

As can be seen in FIG. 5, the first grounding resilient arm portions 54B, which extend upwardly from the upper edge of the first ground plate portion 54A, are formed to be of the same length as the resilient signal arm portions 53B of the straight terminals 53. Two adjacent paired first grounding resilient arm portions 54B are positioned on both sides of a pair of resilient signal arm portions 53B in the connector width direction. The first grounding resilient arm portions 54B are adapted for resilient displacement in the through-thickness direction (X-axis direction) thereof. Two first ground contact portions 54B-1 used for contacting the first ground layer 27 of the intermediate circuit boards 20 of the intermediate connector 1 are formed protruding curvingly toward side X1 in the top end portions of the first grounding resilient arm portions 54B. As can be seen in FIG. 3 (B), FIG. 4 (A) and FIG. 6 (B), the first ground contact portions 54B-1 are located in the same row in the connector width direction as the signal contact portions 53B-1 of the pair of straight terminals 53.

As can be seen in FIG. 5, the first ground connection portions 54C project downwardly from the bottom edge of the first ground plate portion 54A at the same locations in the connector width direction as the first grounding resilient arm portions 54B. In addition, the first ground connection portions 54C are positioned on both sides of the two signal connection portions 53C of the signal terminal pairs 52 in the connector width direction. Solder balls B are attached to the first ground connection portions 54C (see FIG. 3 (A, B), FIG. 4 (A), and FIG. 6 (B)). The first ground connection portions 54C are solder-connected to the ground circuits (not shown) of circuit board P (see FIG. 3 (A)) by the solder balls B.

The second ground member 55, which is in surface contact with the major face of the retaining member 51 on side X1, has a second ground plate portion 55A extending along said major face, two second grounding resilient arm portions 55B extending upwardly from the second ground plate portion 55A at multiple locations in the connector width direction (Y-axis direction), and second ground connection portions 55C extending downwardly from the second ground plate portion 55A at multiple locations in the connector width direction.

As can be seen in FIG. 5, retained protrusions 55A-1 are formed on the second ground plate portion 55A at predetermined intervals in the connector width direction. The retained protrusions 55A-1, which are identical in shape to the retained protrusions 54A-2 of the first ground member 54, protrude toward side X2 at locations different from the second grounding resilient arm portions 55B, in other words, at locations different from the signal terminal pairs 52 in the connector width direction. Specifically, as shown in FIG. 5, the retained protrusions 55A-1 are positioned in alignment with the retaining aperture portions 51B of the retaining member 51. Once engaged with the retaining aperture portions 51B of the retaining member 51, the retained protrusions 55A-1 are retained by co-molding (insert molding) with the shorting member 56.

In addition, as can be seen in FIG. 5, in the same manner as the first ground plate portion 54A, the second ground plate portion 55A has second ground through-hole portions 55A-2 extending through the second ground plate portion 55A in the through-thickness direction (X-axis direction) at locations corresponding to the retained protrusions 55A-1. The second ground through-hole portions 55A-2 are of the same shape as the first ground through-hole portions 54A-3 of the first ground plate portion 54A.

As can be seen in FIG. 5, the second grounding resilient arm portions 55B extend upwardly from the upper edge of the second ground plate portion 55A. Two adjacent paired second grounding resilient arm portions 55B have their top end portions located in closer proximity to one another than the two bottom end portions while being linked by a transverse portion 55D extending in the connector width direction at an intermediate location in the up-down direction. The second grounding resilient arm portions 55B are adapted for resilient displacement in the through-thickness direction thereof (X-axis direction). Two second ground contact portions 55B-1 used for contacting the second ground layer 28 of the intermediate circuit boards 20 of the intermediate connector 1 are formed protruding curvingly toward side X2 in the top end portions of the second grounding resilient arm portions 55B. These two second ground contact portions 55B-1 are in the same positions in the connector width direction and in the up-down direction as the signal contact portions 53B-1 of the pairs of resilient signal arm portions 53B and, as can be seen in FIG. 3 (B) and FIG. 4 (A), are opposed to two signal contact portions 53B-1.

As can be seen in FIG. 5, the second ground connection portions 55C project downwardly from the bottom edge of the second ground plate portion 55A at locations corresponding to both sides of the pairs of second grounding resilient arm portions 55B in the connector width direction. In the connector width direction, the second ground connection portions 55C are positioned on both sides of the two signal connection portions 53C of the signal terminal pairs 52 and are at the same locations as the first ground connection portions 54C of the first ground member 54. Solder balls B are attached to the second ground connection portions 55C (see FIG. 6 (B)). The second ground connection portions 55C are solder-connected to the ground circuits (not shown) of circuit board P (see FIG. 3 (A)) by the solder balls B.

As shown in FIG. 3 (B), the shorting member 56 is formed by co-molding (insert molding) with the first ground plate portion 54A of the first ground member 54 and the second ground plate portion 55A of the second ground member 55. As shown in FIG. 4 (B), the shorting member 56 has first base portions 56A, second base portions 56B, and coupling portions 56C that are provided at multiple locations in the connector width direction, and linking portions 56D that extend in the connector width direction and that link the multiple first base portions 56A together and the multiple second base portions 56B together.

Figure 6A:
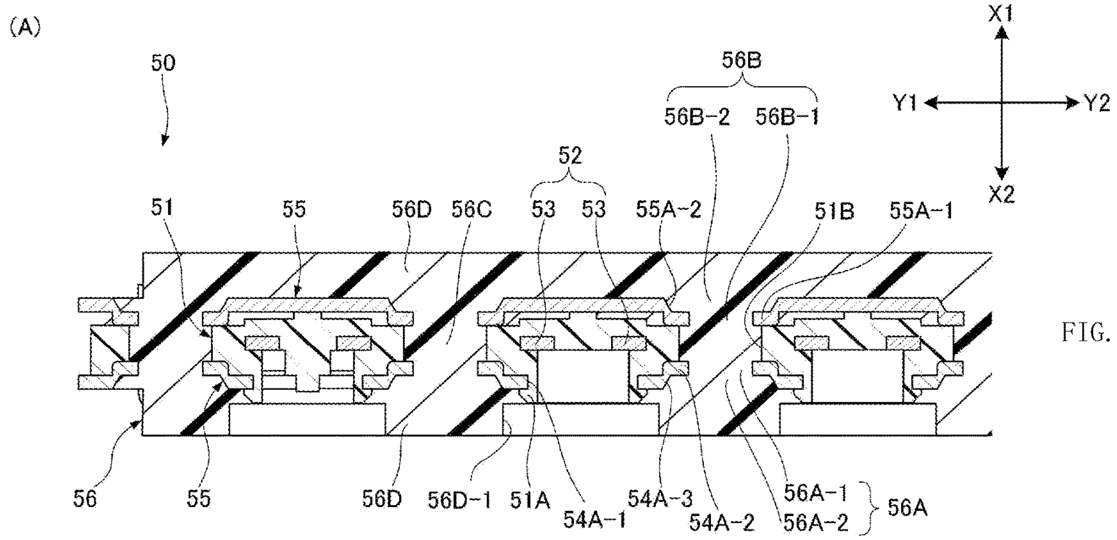
FIG. 6 (A) is a cross-sectional view illustrating a portion of a VIA-VIA cross-section of the terminal retainer of FIG. 3 (B) on an enlarged scale, and FIG. 6 (B) is a VIB-VIB cross-sectional view of the terminal retainer of FIG. 3 (B).
Figure 6B:
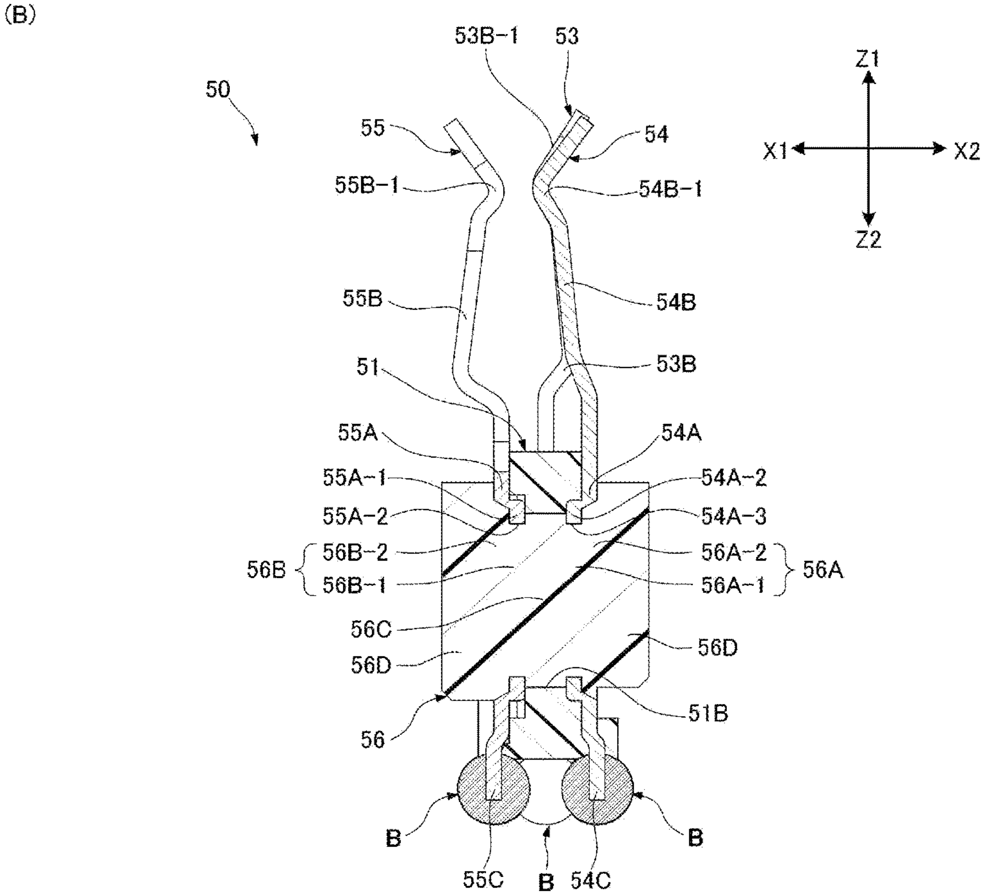

As shown in FIG. 3 (B) and FIGS. 6 (A) and 6 (B), the first base portions 56A, which are formed with a shape adapted to the first ground through-hole portions 54A-3 of the first ground plate portion 54A, are located within the first ground through-hole portions 54A-3 in contact with the interior wall surface of the first ground through-hole portions 54A-3. Specifically, as shown in FIGS. 6 (A) and 6 (B), the first base portions 56A have a first small base portion 56A-1 located on side X1 and a first large base portion 56A-2 located on side X2. The first small base portion 56A-1 is formed slightly smaller than the first large base portion 56A-2 in the connector width direction (Y-axis direction) and in the up-down direction (Z-axis direction), as a result of which the interfacing section between the first small base portion 56A-1 and the first large base portion 56A-2 has a stepped configuration.

As shown in FIGS. 6 (A) and 6 (B), the second base portions 56B, which are identical in shape to the first base portions 56A, are formed with a shape adapted to the second ground through-hole portions 55A-2 of the second ground plate portion 55A. The second base portions 56B are located within the second ground through-hole portions 55A-2 in contact with the interior wall surface of the second ground through-hole portions 55A-2. Specifically, as shown in FIGS. 6 (A) and 6 (B), the second base portions 56B have a second small base portion 56B-1 located on side X2 and a second large base portion 56B-2 located on side X1. The second small base portion 56B-1 is formed slightly smaller than the second large base portion 56B-2 in the connector width direction (Y-axis direction) and in the up-down direction (Z-axis direction), as a result of which the interfacing section between the second small base portion 56B-1 and the second large base portion 56B-2 has a stepped configuration.

The coupling portions 56C are located within the retaining aperture portions 51B of the retaining member 51 and are coupled to the first base portions 56A and the second base portions 56B, i.e., more specifically, as shown in FIGS. 6 (A) and 6 (B), to the first small base portions 56A-1 of the first base portions 56A and the second small base portions 56B-1 of the second base portions 56B. The coupling portions 56C closely adhere to the interior surface of the retaining aperture portions 51B. In the present embodiment, as shown in FIGS. 6 (A) and 6 (B), the coupling portions 56C are formed slightly larger than the first small base portions 56A-2 and the second small base portions 56B-2 in the connector width direction and in the up-down direction, and are engaged and locked with the retained protrusions 54A-2, 55A-1.

As shown in FIG. 4 (B), there are two linking portions 56D provided in the shorting member 56, with these linking portions 56D extending in parallel with each other in the connector width direction (Y-axis direction). As shown in FIG. 3 (B) and FIGS. 4 (A) and 4 (B), the linking portions 56D, which are of a plate-like configuration whose longitudinal direction is the connector width direction, extend along the respective major faces of the first ground plate portion 54A and the second ground plate portion 55A. As shown in FIG. 3 (B), each linking portion 56D is formed slightly smaller than the major faces of the retaining member 51 in the connector width direction and in the up-down direction, i.e., just a bit smaller than the major faces of the retaining member 51.

The linking portion 56D located on side X1 couples all the second base portions 56B, i.e., more specifically, the second large base portions 56B-2 of the second base portions 56B. This linking portion 56D is in surface contact with and closely adheres to the major face of the second ground plate portion 55A on side X1. The linking portion 56D located on side X2, which is identical in shape to the linking portion 56D located on side X1, couples all the first base portions 56A, i.e., more specifically, the first large base portions 56A-2 of the first base portions 56A. This linking portion 56D is in surface contact with and closely adheres to the major face of the first ground plate portion 54A on side X2. In addition, in the present embodiment, as shown in FIG. 4 (B), multiple aperture portions 56D-1 are formed in the linking portion 56D located on side X2. The aperture portions 56D-1, which are formed at locations corresponding to the retained aperture portions 54A-1 of the first ground member 54 (see FIG. 5), are adapted to be in communication with the retained aperture portions 54A-1.

The board connector 3 is manufactured in the following manner. First, with multiple signal terminal pairs 52 and a first ground member 54 disposed in a mold used for primary forming (not shown), molten electrically insulating material is injected into the mold and allowed to solidify (primary insert molding). The electrically insulating material solidifies to form a retaining member 51, thereby obtaining a complete primary retainer, in which the signal terminal pairs 52 and the first ground member 54 are retained by the retaining member 51.

Next, with the above-mentioned primary retainer and a second ground member 55 disposed in a mold used for secondary forming (not shown), molten electrically conductive plastic material is injected into the mold and allowed to solidify (secondary insert molding). At such time, the electrically conductive plastic material fills the ground through-hole portions 54A-3, 55A-2 of the ground members 54, 55 and the retaining aperture portions 51B of the retaining member 51 and solidifies, thereby forming the base portions 56A, 56B and the coupling portions 56C. In this manner, the electrically conductive plastic material solidifies in the above-mentioned mold to form a shorting member 56, thereby obtaining a complete terminal retainer 50, in which the above-mentioned primary retainer and the second ground member 55 are retained by the shorting member 56.

Next, the terminal retainers 50 are press-fitted from above into groove portions between adjacent intermediate walls 41D in the lower housing 42, causing the lower housing 42 to retain in place multiple terminal retainers 50 arranged side by side in the connector length direction (X-axis direction). In addition, the long press-fit portions 62 and short press-fit portions 63 of the two anchoring members 60 of sheet metal are inserted from below into the lower coupling groove portions of the lower housing 42. At such time, the short press-fit portions 63 are press-fittingly retained in the lower coupling groove portions. The upper housing 41 is then attached to the lower housing 42 from above and, at the same time, the long press-fit portions 62 of the anchoring members 60 are press-fitted into the upper coupling groove portions of the upper housing 41 from below. The attachment of the upper housing 41 in this manner results in a complete board connector 3. In addition, board connector 2 is manufactured in accordance with the same procedure as board connector 3.

The operation of mating of the intermediate connector 1 and the board connectors 2, 3 will be described next. First, the board connectors 2, 3 are solder-attached to the respective different circuit boards. Next, as can be seen in FIG. 1, the intermediate connector 1 is positioned above board connector 3.

Next, the intermediate connector 1 is lowered (see arrow in FIG. 1) and the intermediate circuit boards 20 are inserted and connected to the respective corresponding terminal retainers 50 of the board connector 3 from above. Once the mating of the intermediate connector 1 with the board connector 3 is complete, the signal contact portions 53B-1 of the signal terminal pairs 52 provided in the board connector 3 are brought into contact under contact pressure and placed in electrical communication with the signal connection portions 23A, 25A of the electrically conductive pattern pairs 22, 24 provided on the intermediate circuit boards 20. At the same time, the first ground contact portions 54B-1 of the first ground member 54 provided on the board connector 3 are brought into contact under contact pressure and placed in electrical communication with the first ground layer connection portions 27A of the first ground layer 27 provided on the intermediate circuit boards 20. In addition, the second ground contact portions 55B-1 of the second ground member 55 provided on the board connector 3 are brought into contact under contact pressure and placed in electrical communication with the second ground layer connection portions 28A of the second ground layer 28 provided on the intermediate circuit boards 20. At such time, the signal contact portions 53B-1 and ground contact portions 54B-1, 55B-1 of the board connector 3 are subject to pressure forces from the intermediate circuit boards 20 and undergo resilient displacement in the through-thickness direction (X-axis direction).

Next, the board connector 2 is matingly connected to the intermediate connector 1 from above (see arrows in FIG. 1) in an orientation vertically inverted with respect to board connector 3 (in the orientation illustrated in FIG. 1). The procedure for matingly connecting board connector 2 is identical to the procedure previously discussed in connection with board connector 3.

By doing so, board connector 2 and board connector 3 are matingly connected to the intermediate connector 1, thereby electrically connecting board connector 2 and board connector 3 through the medium of the intermediate connector 1.

In the present embodiment, as shown in FIGS. 6 (A) and 6 (B), the shorting member 56 is formed from electrically conductive plastics as discussed previously and has a configuration wherein the first base portions 56A, which are located within the first ground through-hole portions 54A-3 and are placed in contact with the first ground plate portions 54A, and the second base portions 56B, which are located within the second ground through-hole portions 55A-2 and are placed in contact with the second ground plate portions 55A, are coupled by the coupling portions 56C located within the retaining aperture portions 51B. In other words, the first ground member 54 and the second ground member 55 are placed in electrical communication as a result of shorting through the medium of the shorting member 56.

In the present embodiment, the shorting member 56 is formed by co-molding (insert molding) with the first ground plate portion 54A and the second ground plate portion 55A. Specifically, the process of secondary forming during the manufacture of the board connectors 2, 3 involves injecting molten electrically conductive plastic material into a mold used for secondary forming and allowing it to solidify. At such time, the first ground through-hole portions 54A-3, the second ground through-hole portions 55A-2, and the retaining aperture portions 51B of the retaining member 51 are filled with the molten electrically conductive plastic material in a gapless manner. In the present embodiment, a configuration, in which the first base portions 56A closely adhering to the first ground plate portion 54A and the second base portions 56B closely adhering to the second ground plate portion 55A are made into a single part through the medium of the coupling portions 56C, is readily obtained in this manner by co-molding using electrically conductive plastics.

In the shorting member 56, which is molded as a single part in this manner, the first base portions 56A, second base portions 56B, and coupling portions 56C form a single piece in a continuous manner. Therefore, the first ground member 54 and the second ground member 55 can be reliably shorted and a stable state of electrical communication can be readily ensured. As a result, the balance of electrical coupling of the signal terminal pairs 52 and the ground members 54, 55 is adequately ensured. It should be noted that while the first ground member 54 and the second ground member 55 are shorted by the shorting member 56 as described above, they may also be placed in electrical communication by bringing the retained protrusions 54A-2 of the first ground member 54 and the retained protrusions 55A-1 of the second ground member 55 into direct contact (surface contact) with one another via protruding apical faces.

In addition, due to the fact that in the present embodiment the linking portions 56D couple multiple first base portions 56A on side X2 together and the second base portions 56B on side X1 together, a configuration is obtained in which these first base portions 56A and second base portions 56B are respectively formed into one piece through the medium of the respective linking portions 56D. Accordingly, the state of electrical communication between the first ground member 54 and the second ground member 55 through the medium of the shorting member 56 is made more stable.

In addition, in the present embodiment, placing the linking portions 56D in surface contact with the respective major faces of the ground plate portions 54A, 55A increases the area of contact of the shorting member 56 with the first ground member 54 and the second ground member 55 and, therefore, the state of electrical communication between the first ground member 54 and the second ground member 55 through the medium of the shorting member 56 is made more stable. In addition, since the respective major faces of the ground plate portions 54A, 55A are maintained in close adherence by the linking portions 56D, the ground plate portions 54A, 55A can be firmly retained.

In the present embodiment, the board connectors 2, 3 have no ground terminals provided between adjacent signal terminal pairs 52, and the first base portions 56A, second base portions 56B, and coupling portions 56C of the shorting member 56 are provided between the signal terminal pairs 52. Therefore, solid first base portions 56A, second base portions 56B, and coupling portions 56C of sufficiently large dimensions in the connector width direction and in the up-down direction can be formed using the range between the signal terminal pairs 52. Therefore, the shape of the first base portions 56A, second base portions 56B, and coupling portions 56C can be simplified and adequate strength thereof can be ensured.

It should be noted that as long as a sufficiently stable state of electrical communication between the first ground member 54 and the second ground member 55 is ensured, coupling the multiple first base portions 56A together and the second base portions 56B together with the help of the linking portions 56D is not of the essence and, for example, the shorting member 56 may be adapted by omitting the linking portions 56D. In such a case, shorting members 56 having first base portions 56A, second base portions 56B, and coupling portions 56C would be adapted to be disposed at multiple locations in the connector width direction.

It should be noted that while the present embodiment describes forming ground through-hole portions 54A-3, 55A-2 in the ground plate portions 54A, 55A, forming such aperture portions is not of the essence. For example, notched portions, which, along with extending through the ground plate portions in the through-thickness direction and having a portion of their perimeter edge open, may be formed instead of the aperture portions. In such a case, the first base portions and second base portions of the shorting member would be located within the notched portions in contact with the ground plate portions. In addition, the first base portions and second base portions of the shorting member may be brought into contact with any part of each ground member without forming aperture portions or notched portions in the shorting member 56.

In addition, although in the present embodiment signal transmission paths are constituted by electrically conductive pattern pairs 22, 24 in the intermediate connector 1 and by signal terminal pairs 52 in the board connectors 2, 3, the signal transmission paths need not be constituted by pairs and may be constituted by single-ended electrically conductive patterns and single signal terminals.

DESCRIPTION OF THE REFERENCE NUMERALS

2 Board connector (electrical connector)
3 Board connector (electrical connector)
51 Retaining member
51B Retaining aperture portion (perforation portion)
52 Signal terminal pair (signal transmission path)
54 First ground member
55 Second ground member
56 Shorting member
56A First base portion
56B Second base portion
56C Coupling portion
56D Linking portion

The invention claimed is:

1. An electrical connector comprising:
multiple metallic signal transmission paths,
a plate-shaped retaining member of electrically insulating material retaining the multiple signal transmission paths, and
a first ground member of metal provided on one side of the retaining member in the through-thickness direction of the retaining member and a second ground member of metal provided on the other side, wherein
the retaining member, which retains rows of signal transmission paths consisting of the multiple signal transmission paths arranged side by side in a direction along the major faces of the retaining member together with the first ground member and second ground member, has perforation portions extending in the through-thickness direction at locations between adjacent signal transmission paths;
the electrical connector has provided therein a shorting member of electrically conductive plastics co-molded with the first ground member and second ground member; and
the shorting member has first base portions that are located at the first ground member side and are in contact with the first ground member, second base portions that are located at the second ground member side and are in contact with the second ground member, and coupling portions that are located within the perforation portions and couple the first base portions and the second base portions.

2. The electrical connector according to claim 1 wherein, in addition to having the first base portions, second base portions, and the coupling portions at multiple locations in the array direction of the signal transmission paths, the shorting member has linking portions that extend in the array direction along the first ground member and the second ground member and link the first base portions together and the second base portions together at the multiple locations.

3. The electrical connector according to claim 2, wherein the linking portions are in surface contact with each of the first ground member and second ground member.

* * * * *